US008486214B2

(12) United States Patent
Lai (10) Patent No.: US 8,486,214 B2
(45) Date of Patent: Jul. 16, 2013

(54) RAMPED, VARIABLE POWER UV ADHESIVE CURE PROCESS FOR IMPROVED ALIGNMENT

(75) Inventor: Alexin Lai, Chengdu (CN)

(73) Assignee: Source Photonics, Inc., Chatsworth, CA (US)

( * ) Notice: Subject to any disclaimer, the term of this patent is extended or adjusted under 35 U.S.C. 154(b) by 65 days.

(21) Appl. No.: 13/246,522

(22) Filed: Sep. 27, 2011

(65) Prior Publication Data
US 2013/0075031 A1 Mar. 28, 2013

(51) Int. Cl.
*B29C 65/00* (2006.01)

(52) U.S. Cl.
USPC ..................................... 156/272.2

(58) Field of Classification Search
USPC ................... 156/272.2, 275.5, 293
See application file for complete search history.

(56) References Cited

U.S. PATENT DOCUMENTS

| 2002/0003705 A1* | 1/2002 | Tanaka ........................ 362/335 |
| 2003/0071368 A1* | 4/2003 | Rubinsztajn .................. 257/793 |
| 2003/0228114 A1* | 12/2003 | Fathi et al. ................... 385/91 |

OTHER PUBLICATIONS

Derek Wyatt; "Processing Guidelines for Photocurable Adhesives"; Lasers & Optronics; Feb. 2000; pp. 11-13; Ablestik Laboratories; US.
"EPO-TEK 353ND Technical Data Sheet"; Epoxy Technology, Inc.; Jun. 2010; Rev. XXV; US.
J.M. Trewhella, G.W. Johnson, W.K. Hogan and D.L. Karst; "Evolution of Optical Subassemblies in IBM Data Communication Transceivers"; IBM J. Res. & Dev.; Mar./May 2003; pp. 251-258; vol. 47, No. 2/3; IBM, US.

* cited by examiner

*Primary Examiner* — Daniel McNally
(74) *Attorney, Agent, or Firm* — Andrew D. Fortney (57) ABSTRACT

Methods and apparatuses for adhering optoelectronic components in optical, electronic or optoelectronic devices are disclosed. A UV-active adhesive is applied to an alignment sensitive component of the device. A first, relatively low dose of UV radiation sufficient to solidify an outer layer of the adhesive is applied to the adhesive. A second, relatively high dose of UV radiation sufficient to solidify the remaining thickness of the adhesive is then applied. The methods and apparatuses of the present invention advantageously reduce or eliminate changes in the position of a component during the adhesive curing process. The present method and apparatus allow for shorter total time for solidifying the adhesive, provide stable positioning during the adhesive solidification process, and enable increased manufacturing output and decreased waste.

13 Claims, 5 Drawing Sheets

RAMPED, VARIABLE POWER UV ADHESIVE CURE PROCESS FOR IMPROVED ALIGNMENT

FIELD OF THE INVENTION

The present invention generally relates to the field of optical, electronic, and optoelectronic devices. More specifically, embodiments of the present invention pertain to methods and apparatuses for adhering components in an optical, electronic, or optoelectronic device (e.g., an optical signal transmission and/or reception device, such as a transceiver for a fiber optic network).

DISCUSSION OF THE BACKGROUND

Optical transceivers send and receive data in an optical form over an optical link, such as a fiber-optic link An optical transmitter can include laser driver circuitry to drive a diode, such as a light-emitting diode (LED), to create optical pulses on the fiber-optic link from received electronic signals. An optical receiver can include a photodiode to receive optical signals from the optical link, which are then converted into electronic signals. Thus, an optical transceiver converts (i) optical signals into analog and/or digital electronic signals and (ii) electronic signals into optical signals.

Figure 1:
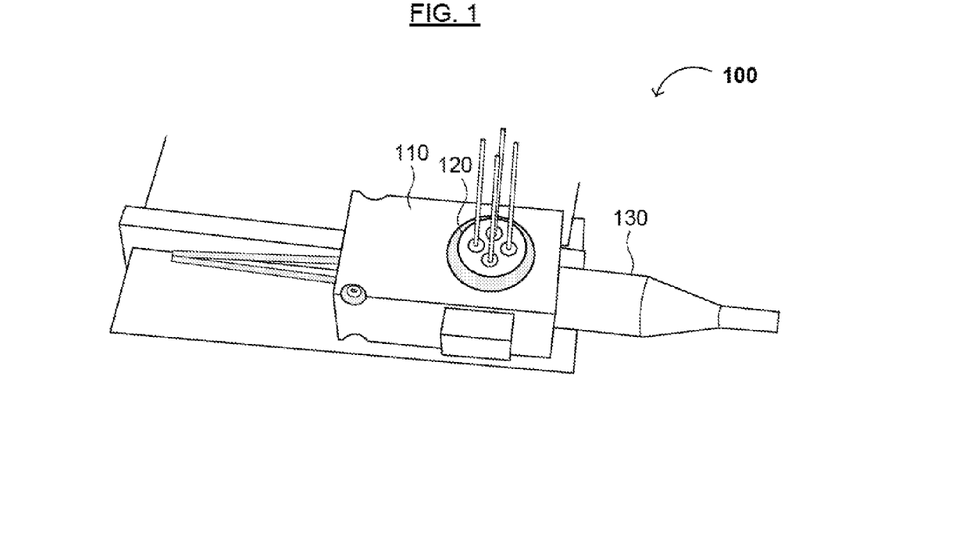
FIG. 1 is a diagram showing an exemplary optoelectronic device.

An exemplary optoelectronic device 100 (e.g., an optical transceiver) is shown in FIG. 1. In order for the optoelectronic device 100 to function correctly, a base optical sub-assembly (BOSA) (e.g., a transmitter optical sub-assembly including a laser diode [LD] and/or a receiver optical sub-assembly including a photodiode [PD] 120) is mounted in a transceiver housing 110 such that the LD or PD in the BOSA is properly aligned with an end of the optical fiber in the transceiver housing 110. In general, the photodiode and the optical fiber housing 130 are alignment-sensitive, and improper alignment can result in failure of the electronic or optoelectronic device. In some approaches, the photodiode is attached to or mounted in the transceiver housing 110 with an adhesive (e.g., an ultraviolet [UV]-active glue, such as a UV-active epoxy). However, during the adhesive curing process, the components can move or shift, which may result in misalignment of the photodiode with one or more light-focusing and/or light receiving elements (e.g., one or more lenses and/or mirrors, an optical fiber or other light-carrying medium, etc.) in the transceiver housing 110. In some instances, the misalignment can lead to production output losses when the optical transceiver or device 100 does not meet quality control or performance requirements.

SUMMARY OF THE INVENTION

Embodiments of the present invention relate to methods and apparatuses for adhering alignment-sensitive components in an optical, electronic, or optoelectronic device.

In one embodiment, a method of adhering components in an optical, electronic, or optoelectronic device can include (a) applying a UV-active adhesive or glue onto an alignment-sensitive component of the device; (b) placing the alignment-sensitive component in the device, the device being attached to an adjustable (movable) base; (c) applying a first, relatively low dose of UV radiation to the adhesive, sufficient to solidify an outer layer of the adhesive; and (d) applying a second, relatively high dose of UV radiation to the adhesive, sufficient to solidify a remaining thickness of the adhesive.

In another embodiment, an apparatus for adhering an optical, electronic, or optoelectronic component can comprise (a) an adjustable (movable) base configured to secure a device housing; (b) a chuck, mechanical socket, or similar controllable mechanism configured to place an alignment-sensitive component in the device housing; (c) a nozzle configured to deposit a UV-active adhesive onto the alignment-sensitive component; (d) one or more UV light-emitting devices configured to provide a variable dose of UV radiation to the adhesive; and (e) a controller configured to vary and control a radiation output of the UV light-emitting device.

Embodiments of the present invention advantageously provide an approach that reduces or eliminates the shifting or relative movement of alignment-sensitive components in an optical, electronic or optoelectronic device that can occur during the adhesive curing process. Embodiments of the present invention allow for maintaining a stable, aligned position of optical, electronic or optoelectronic device components during and after the adhesive solidification process. Perhaps more surprisingly, embodiments of the present invention enable a shorter total time for solidifying the adhesive. The methods and apparatuses of the present invention can result in an increase in yield (e.g., the number of optical, electronic, or optoelectronic devices that comply with predetermined product specifications and/or acceptable industry standards), which increases overall manufacturing output and decreases waste. These and other advantages of the present invention will become readily apparent from the detailed description of exemplary embodiments below.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Furthermore, in the context of this application, the term "alignment-sensitive component" generally refers to a structure that is dependent on relatively precise alignment with one or more structures in another component for proper functioning. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "time," "rate," "period" and "frequency" are, in general, interchangeable and may be used interchangeably herein, but are generally given their art-recognized meanings Also, for convenience and simplicity, the terms "optical device," "electronic device" and "optoelectronic device," as well as the terms "optoelectronic transceiver" and "transceiver," may be used interchangeably, but these terms are generally given their art-recognized meanings herein.

Embodiments of the present invention advantageously provide an approach that reduces or eliminates the shifting or changes in the position of alignment-sensitive components that can occur during an adhesive curing process. Specifically, embodiments of the present invention can provide (1) stable positioning of such alignment-sensitive components during and after the adhesive solidification process and (2) a shorter total time for solidifying the adhesive. In addition, embodiments of the present invention enable an increase in the manufacturing and/or assembly yield of the optical, electronic, or optoelectronic device. The invention, in its various aspects, will be explained in greater detail below with regard to exemplary embodiments.

Exemplary Methods of Adhering Components in an Optical, Electronic, or Optoelectronic Device In one exemplary embodiment, components in an optical, electronic, or optoelectronic device (e.g., an optical transceiver, transmitter, receiver, optoelectronic switch or repeater, an image sensor [e.g., digital camera], a light detector, etc.) may be adhered by applying a UV-active adhesive (e.g., a light curing material [LCM]) onto an alignment-sensitive component of the device. The alignment-sensitive component with the UV adhesive is then placed into the device (e.g., a metal housing), which is attached to an adjustable (or movable) base. When the alignment-sensitive component receives light (e.g., a photodiode), it is generally placed face-down into the device. The base may have thereon a clamp or other device holding and/or securing mechanism having an adjustable position.

After the alignment-sensitive component is placed into the device, a light (e.g., modeling a light signal received by a transceiver in an optical network) is directed towards the component, and the position of the device is adjusted while an output parameter of the alignment-sensitive component is monitored. A maximum value of the output parameter is determined, and when the output parameter is at the maximum value, a first, relatively low dose of UV radiation is applied to the adhesive. The first, relatively low dose of UV radiation is generally sufficient to solidify an outer layer of the adhesive, so that the alignment-sensitive component does not easily shift during the remaining solidification process. A second, relatively high dose of UV radiation is then applied to the adhesive. The second dose of UV radiation is generally sufficient to solidify the remaining thickness of the adhesive. In exemplary embodiments, applying each of the first and the second doses of UV radiation comprises providing sufficient current or power to at least one LED to cause the LED(s) to emit UV light at the relatively low and the relatively high dose, respectively. Various stages of the exemplary method are described in detail herein with regard to FIGS. 2A-2C, FIG. 4, and FIGS. 6A-6B.

Figure 2A:
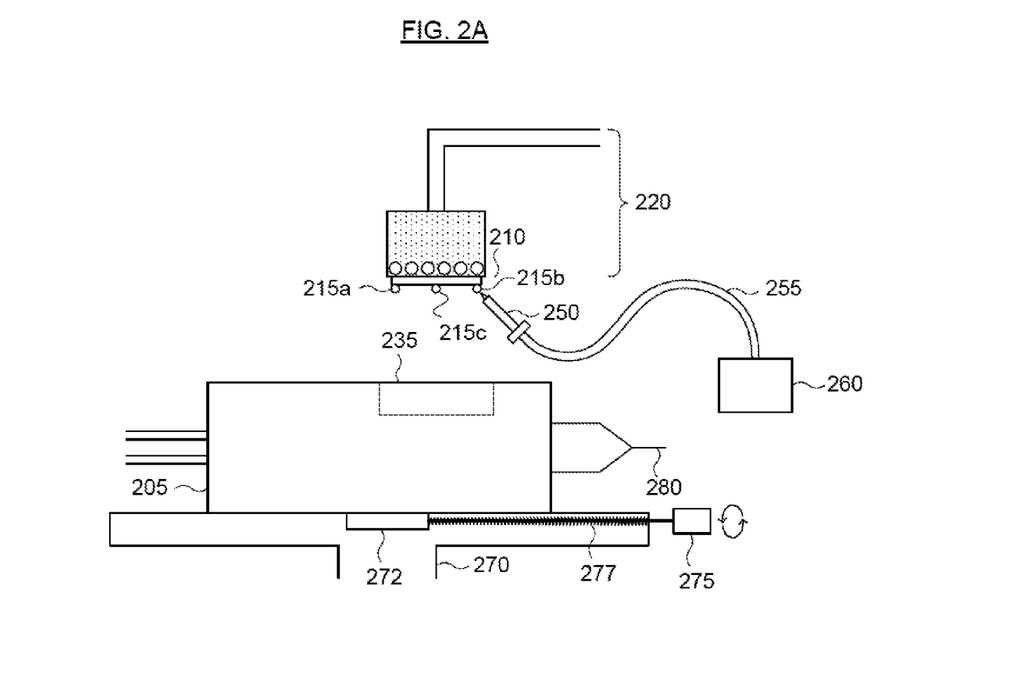
FIG. 2A is a diagram showing a UV adhesive being applied to a component of an optoelectronic device in an exemplary method in accordance with embodiments of the present invention.

As shown in FIG. 2A, a UV-active adhesive 215*a*-*c* is applied to or otherwise deposited on an alignment-sensitive component 210 of the device in one or more predetermined locations. In exemplary embodiments, one or more discrete drops, beads, or dots of the adhesive (e.g., 1 drop, 2 drops, 3 drops, 5 or more drops, etc.) is/are applied to the alignment-sensitive component (see, e.g., reference characters 215*a*-*c* of FIG. 2B). The UV-active adhesive may be applied automatically or manually, as desired. The UV-active adhesive 215*a*-*c* may comprise an epoxy, an acrylate (e.g., a cyanoacrylate, acrylic acid, methacrylic acid, esters or amides of such acids, substituted variants of such [meth]acrylic acids, esters, or amides, etc.), a parylene, a silicone precursor, a polyurethane, or other adhesive known in the art that can be cured or solidified upon exposure to ultraviolet light. In many cases, the UV-active adhesive 215*a*-*c* may comprise a linkable adhesive (e.g., the epoxy compound, the acrylate, the urethane, etc.) and an activator (e.g., a benzophenone activator in the case of an acrylate, a diamine and/or polyamine in the case of an epoxy, etc.). In some exemplary embodiments, the UV-active adhesive 215*a*-*c* /has a viscosity of from about 1,000 cP to about 10,000 cP (e.g., at 50 RPM and 23° C.) or any value or range of values therein (e.g., 2,000 cP to 8,000 cP, 3,000 cP to 5,000 cP, etc.). In some implementations, the adhesive has a glass transition temperature of less than 150° C., 120° C. or 90° C. (e.g., with a dynamic cure temperature of from 20° C. to 200° C.).

In further embodiments, a second adhesive is applied on the alignment-sensitive component 210 adjacent to or inside the UV-active adhesive 215*a*-*c*. The second adhesive may comprise a linkable adhesive of the same or different type as the UV-active adhesive 215*a*-*c*, or it may comprise a thermally-activated adhesive (as is known in the art). The second adhesive may therefore be cured by application of UV radiation and/or thermal energy (i.e., heat).

Figure 2B:
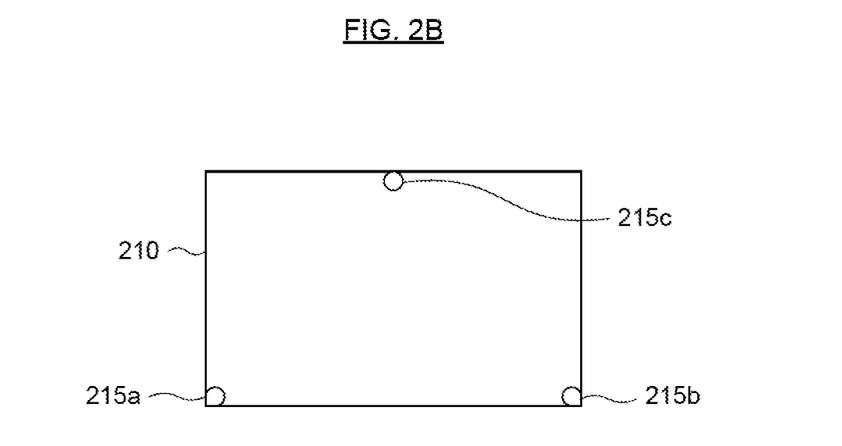
FIG. 2B is a bottom view showing the UV adhesive applied to the component of FIG. 2A.

The UV-active adhesive 215*a*-*c* and the optional second adhesive may be applied to the alignment-sensitive component 210 using any suitable method or apparatus known in the art. For example, the adhesive may be applied using a nozzle, a pump, a syringe, a needle, a sprayer, or a hand-held device (see, e.g., reference character 250 of FIG. 2A). In general, the UV-active adhesive 215*a*-*c* is deposited in regions where the alignment-sensitive component 210 may contact other device components. In some exemplary embodiments, the UV-active adhesive 215*a*-*c* may be deposited on the alignment-sensitive component 210 in regions that correspond to one or more LED or other UV light sources. For example, FIG. 2B shows a bottom view of the alignment-sensitive component 210 with UV-active adhesive 215*a*-*c* applied to three locations. The UV-active adhesive 215*a*-*c* in the embodiment of FIG. 2B is applied in locations that correspond to three UV light sources, for example, as shown by reference characters 320a-c of FIG. 3. In an alternative embodiment using a flood lamp to provide the UV light (not shown), the UV-active adhesive may be applied around parts of or the entire perimeter of the alignment-sensitive component 210.

In some embodiments, one or more solvents present in the adhesive 215a-c may be allowed to partially or completely evaporate before the alignment-sensitive component 210 is placed in the device. Alternatively, the solvent(s) present in the adhesive 215a-c may be allowed to partially or completely evaporate after the alignment-sensitive component 210 is placed in the device, but before UV radiation is applied to the adhesive 215a-c. The amount of UV adhesive applied may have a thickness of from 10 μm to 5 mm, or any value or range of values therein. The UV adhesive may be applied to an area of from 0.1 to about 10 mm². Alternatively, the adhesive may be applied to the component in a layer having a thickness of from 10 μm to 1 mm, or any value or range of values therein.

Referring still to FIG. 2A, in some exemplary embodiments, the alignment-sensitive component 210 may comprise a light emitting device such as an LED or laser diode, a light transmitting, focusing and/or reflecting element such as a lens, a mirror, a filter, etc., a light receiving device such as a photodiode, an image sensor, a light detector, etc., or an electromagnetic element such as a read and/or write head for a magnetic recording medium, etc.

Referring again to FIG. 2A, the alignment-sensitive component 210 is held by a chuck, a socket, or any other suitable mechanism known in the art. For example, in one exemplary embodiment, the alignment-sensitive component 210 is secured by a vacuum chuck on a press (see reference character 220 of FIG. 2A). In another embodiment, the first component may be plugged into a socket that mechanically holds the first component in place. The chuck 220 generally allows the UV-active adhesive 215a-c to be applied to the alignment-sensitive device, and is configured to insert or otherwise place the first component 210 into the device, for example, by lowering or pressing the alignment-sensitive component 210 into an opening 235 in the device 205.

The device 205 generally comprises a (metal) housing for one or more elements of the device. The housing 205 generally has at least one opening 235 on at least one surface to allow placement of other components and device elements (e.g., photodiodes, laser diodes, etc.) within the housing 205. The opening 235 also allows the various elements and components to be electrically connected during manufacturing. The housing 205 is held by or otherwise attached to an adjustable (e.g., moveable) base 270 using a holding, securing, or fastening device 272 such as a clamp. In general, one or more alignment knobs 275 (e.g., for a screw-type alignment and/or positioning mechanism 277) on the base 270 may be used to adjust the position of the device 205. The housing 205 can have one or more (typically, a plurality of) connector pins, such as copper leads or lead wires, present thereon or extending therefrom.

In some exemplary embodiments, the alignment-sensitive component 210 comprises at least one photodiode (e.g., a photodiode for receiving an optical signal or for monitoring the presence or intensity of light; an array of photodiodes in a device such as an image sensor, etc.), or a light emitting or transmitting device such as an LED, a laser, a lens or mirror, etc. In some embodiments, changes in the position of the alignment-sensitive component 210 of as small as 1 μm can have significant adverse effects for the performance and/or functionality of the device. In other embodiments, the minimum relative change in position can be as much as 10 μm, 100 μm, 1 mm or other value greater than 1 μm at or above which performance and/or functionality of the device begins to significantly deteriorate and/or fail to meet predefined acceptable criteria and/or values, but it is generally less than about 2 mm. As such, the alignment-sensitive component (e.g., a light source and/or a light receiver) should maintain substantially the same alignment during and after the adhesive application and curing process for the optoelectronic device to function properly and/or perform in accordance with one or more predetermined minimum acceptable values and/or criteria. Small changes in position can also be determined by absolute movement (e.g., at least 0.001 mm, 0.01 mm, 0.1 mm, or any other value greater than 0.001 mm, but generally less than 1 mm).

Figure 2C:
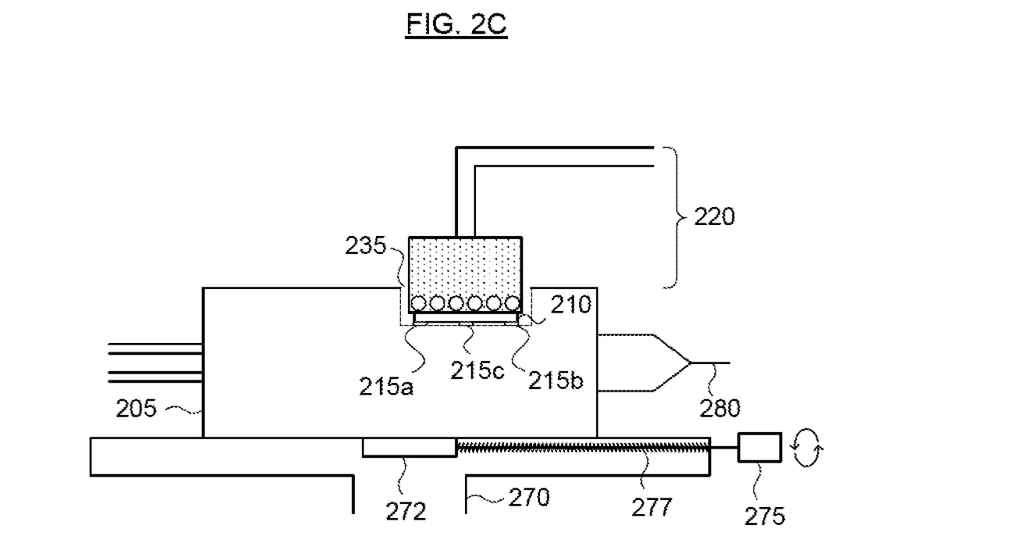
FIG. 2C is a diagram showing an intermediate step of the exemplary method in accordance with embodiments of the present invention.

Referring now to FIG. 2C, after the UV-active adhesive 215a-c is applied to the alignment-sensitive component 210, the alignment-sensitive component 210 is placed in or attached to the device (for example, by lowering the alignment-sensitive component 210 through opening 235 in the device housing 205). The alignment-sensitive component 210 contacts housing 205 so that they become connected by the UV-active adhesive 215a-c. In some embodiments, three or more components of an optical, electronic, or optoelectronic device may be adhered using the present method, in which case the adhesive may be applied to one component in two or more locations at which the other components are to be adhered, to all of the components at respective locations where the components are to be affixed to another component, or some combination thereof. One component can be brought into contact with another using a mechanical arm, a guided mounting frame, or any other device or mechanism that holds the component(s) in place as light or radiation is applied to the adhesive 215a-c. In embodiments using an arm to contact the components, the arm can remain in place during the UV curing process.

After the alignment-sensitive component 210 is placed in the device 205, the position of the device 205 is adjusted, shifted or moved using adjustable holding mechanism 272 on base 270, while an output parameter of the alignment-sensitive component 210 (e.g., current output, output voltage, etc.) is measured and/or monitored. After the maximum value of the output parameter (e.g., maximum current output) is determined, and while the parameter is at the maximum value, a multiple-phase curing process is performed to solidify the UV-active adhesive 215a-c.

For example, in one embodiment, light is applied to the alignment-sensitive component 210 (e.g., a photodiode). Light carried by an optical fiber 280 enters the housing 205 and is reflected by a mirror or a filter (not shown) to the photodiode 210. The current provided at the photodiode 210 converts the received light to a current, which is monitored as the position of the housing 205 is adjusted using the adjustable holding mechanism 272 on base 270. The current output of the photodiode 210 is monitored until a maximum current output is found or determined. The device 205 may then be moved to a UV curing station/apparatus (e.g., described in more detail below with regard to exemplary apparatus 300 [FIG. 3] for adhering optoelectronic components).

Figure 4:
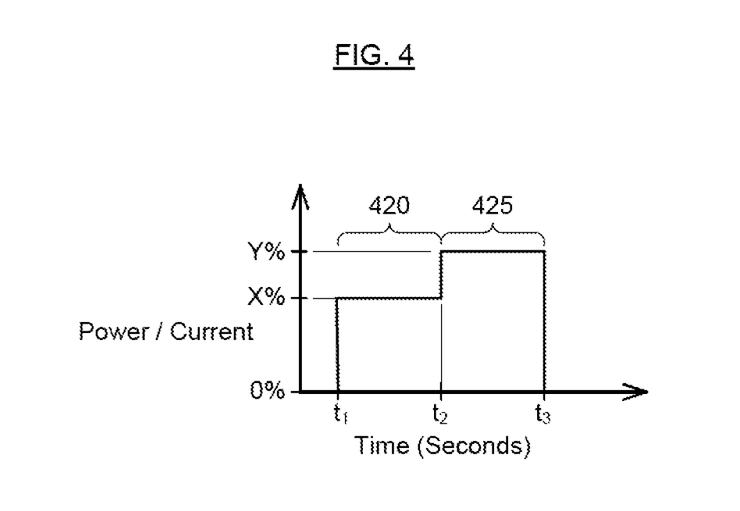
FIG. 4 is a graph showing relative parameter values in an exemplary process for adhering components in an optical, electronic, or optoelectronic device in accordance with embodiments of the present invention.

Referring now to the diagram of FIG. 4, after the maximum current output is determined, a first, relatively low dose of UV radiation is applied to the UV-active adhesive (see, e.g., reference characters 215a-c of FIG. 2B) during a first curing phase 420. The UV adhesive may have an absorbance of the applied wavelength(s) of UV light of from 10% to 90%, or any value or range of values therein. The temperature at which the UV adhesive becomes reactive may be from 50° C. to 200° C., or any temperature or range of temperatures therein. The UV radiation may be applied with a spot curing lamp, a UV curing oven, a hand-held UV lamp, a UV curing conveyor, a UV flood lamp, a focused beam flood lamp, etc. The UV radiation may have a wavelength or wavelength band of from 220 nm to 480 nm, 280 nm to 440 nm, or any value of range of values generally considered to be in the UV spectrum. The first dose of radiation may correspond to or be defined by a current or power provided to a LED or other UV light source.

In this "pre-solidification" step 420, as shown in FIG. 4, the first dose of UV radiation may be generated by providing a first, relatively low current or power "X %" to the UV light source for a period of time sufficient to solidify an outer layer or thickness of the adhesive. The percentage of current or power "X" in the first phase 420 may be relative to a higher percentage of current or power "Y" in the second curing phase 425 (where Y is defined as 100%), or relative to full power/maximum current (defined as 100% of the current or power that can be provided to the light source). In either case, X % may be from 20% to 80% (e.g., 25% to 70% or any value or range of values therein).

The period of time in the first phase 420 sufficient to solidify an outer layer or thickness of the adhesive 215a-c may be determined empirically for any two components being adhered with a particular adhesive or adhesive system, but in general, it may be defined as $t_2-t_1$ in FIG. 4. In some implementations, the first relatively low current is applied for about 1 second to about 30 seconds (e.g., 2 seconds to 15 seconds, 3 seconds to 10 seconds, or any other value or range of values therein).

Alternatively, the first, relatively low current may be specified in absolute terms. For example, the current in the first phase 420 may be from about 1 mA to about 1 A, about 10 to 100 mA, or any other value or range of values between 1 mA and 1 A. In one embodiment, the first dose of radiation may have a minimum intensity of about 50 mW/cm$^2$. In other embodiments, the first dose of radiation has an intensity of from about 70, 80 or 100 mW/cm$^2$ to about 100, 150 or 200 mW/cm$^2$.

Referring again to FIG. 4, the first phase (the "pre-solidification" process) 420 is followed by a second curing phase 425, in which a relatively high dose of UV radiation is applied to the adhesive 215a-c (FIG. 2B). In this "deep solidification" phase 425, the UV radiation is applied at a dose higher than the dose in the first phase 420. For example, the second dose of radiation may be generated by applying to the UV light source a current of from about 25 to 200 mA, or any other value or range of values higher than the current applied to the light source during the first phase 420. Alternatively, the percentage of current or power "Y" in the second phase 425 may be a reference value for the percentage of current or power "X" in the first phase 420 (i.e., "Y" is defined as 100%), or relative to the full power or maximum current that can be provided to the light source. In the latter case, Y % may be from 50% to 100% (e.g., 60% to 90%, or any value or range of values therein).

Generally, the dose is applied for a length of time that is sufficient to solidify a remaining thickness (e.g., the remaining, unsolidified thickness) of the adhesive 215a-c (FIG. 2B). In general, the length of time of the second phase 425 may be defined as $t_3-t_2$ in FIG. 4. The second, relatively high dose or current may be applied for a length of time of from about 1 second to about 30 seconds (e.g., 2 to 15 seconds, 3 to 10 seconds, or any other value or range of values therein).

The above-described two-stage curing process results in a reduction or elimination of changes in the position of alignment sensitive components as the adhesive solidifies, relative to an otherwise similar or identical process in which a single dose of UV radiation is continuously applied. In some exemplary embodiments, the first dose and the second dose of radiation are applied for a total of from 3 seconds to 60 seconds (e.g., 5 to 30 seconds, 7 to 20 seconds, 8 to 15 seconds, or any other value or range of values therein). Consequently, the present method enables an increase in the manufacturing and/or assembly yield (e.g., the number of electronic, optical, and/or optoelectronic devices that meet acceptable product parameters and/or specification[s]; see the section entitled "Examples" herein) and in manufacturing throughput.

After the adhesive is cured, the electrical wiring in the device (e.g., wiring within the housing 205 of FIG. 2A) is connected, as is known in the art. A protective (sealing) cap 120 (FIG. 1) is then placed on the housing 205, as is known in the art. The cap 120 can be attached to the housing 205 using any adhesive known in the art. For example, in one embodiment, the adhesive for attaching the protective cap 120 on the housing 205 comprises a black glue and/or resin applied at the interface between the cap 120 and the housing 205. The adhesive (e.g., black glue) is heated and applied to the outer edges or ring of the sealing cap 120. The adhesive fills gaps and seals the alignment-sensitive component 210 (FIG. 2A) in the housing 205.

In general, the UV adhesive used to attach the alignment-sensitive component 210 of FIG. 2A (photodiode) in the housing 205 has a relatively small force, and the adhesive used to attach the protective cap 120 (FIG. 1) holds with a relatively strong force to ensure that the device components are secure. The sealing cap adhesive can be applied by any method known in the art. For example, a dispenser (e.g., a syringe, a pen-like device, etc.) may supply adhesive from a base and one or more transfer tubes. The base may include one or more storage vessels for storing the adhesive (and optionally, an activator) and/or one or more pumps (not shown) for providing the adhesive to the dispenser. Adhesive dispensers are described in detail herein with regard to exemplary apparatuses for adhering optoelectronic components.

Exemplary Apparatuses for Adhering Optoelectronic Components

The present invention further relates to an apparatus for adhering an optical, electronic, or optoelectronic component. The apparatus can include (a) an adjustable (movable) base configured to secure a device housing, (b) a chuck, mechanical socket or other controllable mechanical or electromechanical device-transporting mechanism configured to place an alignment-sensitive component in the device housing; (c) a nozzle configured to deposit a UV-active adhesive onto the alignment-sensitive component; (d) one or more UV light-emitting devices configured to provide a variable dose of UV radiation to the adhesive; and (e) a controller configured to vary and control an output of the UV light-emitting device.

Figure 3:
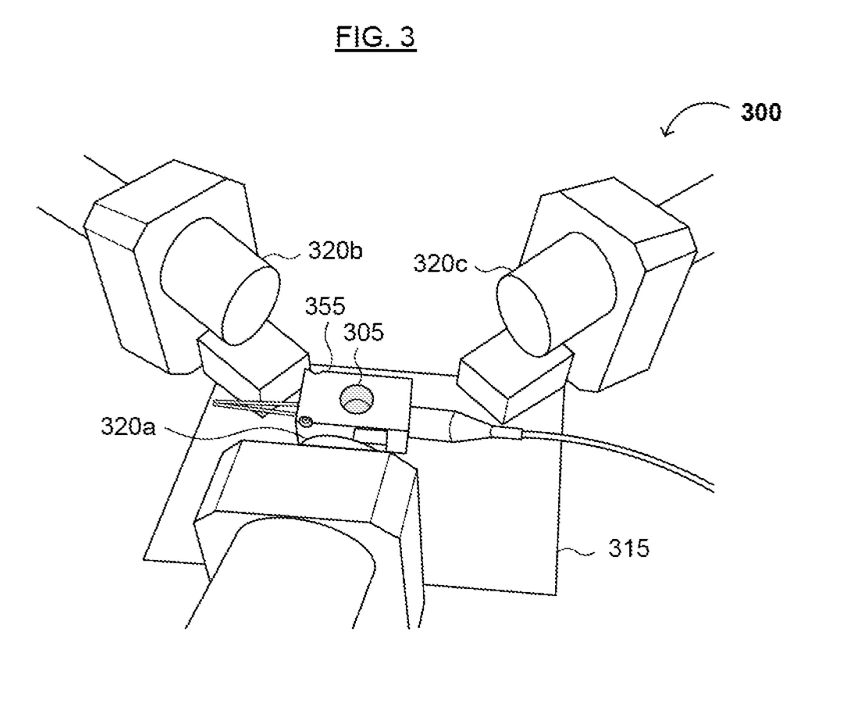
FIG. 3 is a diagram showing an exemplary apparatus for applying UV radiation to the UV-active adhesive in accordance with embodiments of the present invention.

FIG. 3 shows an exemplary apparatus 300 for adhering optoelectronic components according to embodiments of the present invention. As shown in FIG. 3, a device housing 305 is secured on a platform or adjustable base 315. The housing 305 is configured to receive an alignment-sensitive component (e.g., photodiode 210 in FIG. 2A) therein. A UV-active adhesive is applied to the alignment-sensitive component, as previously described herein (see, e.g., FIGS. 2A-B). The UV-active adhesive applied to the alignment-sensitive device component 215 (e.g., a photodiode) may comprise any adhesive previously described herein that can be cured upon exposure to ultraviolet light (see, e.g., the section entitled "Exemplary Methods of Adhering Components in an Optical, Electronic, or Optoelectronic Device"). The adhesive can be applied automatically (e.g., in controlled amounts to predefined locations, using automated or computer-controlled adhesive dispensing equipment), or the adhesive can be applied by hand (e.g., using a syringe or pen-like device, which may have a pump and/or heating mechanism configured to facilitate the flow of adhesive to the predetermined location[s]).

In exemplary implementations, the alignment-sensitive component (e.g., reference character 210 of FIG. 2A) may comprise at least one light receiving device (e.g., a photodiode, light sensor, etc.) or light transmitting device (e.g., a laser diode, LED, etc.). In some implementations, the housing and the alignment-sensitive component have mating features configured to facilitate alignment. Since the alignment-sensitive component is sensitive to changes in relative position, the alignment-sensitive component and the housing should be aligned when the alignment-sensitive component 210 (FIG. 2A) is placed within the housing 305 with the adhesive in place, before the adhesive is cured with UV radiation. The alignment should be maintained during and after curing the adhesive with UV radiation for the optoelectronic device to function properly and achieve target performance criteria.

The apparatus 300 in FIG. 3A further comprises UV light-emitting devices 320a-c configured to provide a variable dose of UV radiation to the adhesive. Each UV light-emitting device 320a, 320b and 320c may comprise a light-emitting diode and one or more lenses (not shown). Alternative UV light sources (e.g., a spot curing lamp, a flood lamp, a UV oven, a hand-held device, a UV-curing conveyor, etc., as described herein) and/or a different number of light sources may also be used. As described herein with regard to the exemplary method(s), the variable dose of UV radiation comprises a first, relatively low dose of UV radiation and a second, relatively high dose of UV radiation. In exemplary embodiments, the first, relatively low dose of radiation is generally sufficient to solidify an outer region of the adhesive, and the second, relatively high dose of radiation is generally sufficient to solidify the remaining thickness of the adhesive.

Referring now to FIG. 2A, the apparatus may further include a mechanism 220 (e.g., a vacuum chuck and press, an electromechanical arm and socket, etc.) configured to place the alignment-sensitive component 210 (e.g., a photodiode) in the housing 205 or 305 (FIGS. 2A and 3, respectively). In some exemplary embodiments, the apparatus also comprises a dispenser (e.g., a syringe, pen-like device, etc.) configured to deposit a UV-adhesive 215a-c (FIG. 2A) onto the alignment-sensitive component 210, as previously described herein (see the section entitled "Exemplary Methods of Adhering Components in an Optical, Electronic, or Optoelectronic Device). The mechanism 220 for placing the alignment-sensitive component (e.g., vacuum chuck and press) and the adhesive dispenser 250 may be included in the same general area or workstation as the UV light-emitting devices 320a-c (FIG. 3), or in a different area or workstation (in which case the first and second components may be transferred to the area of the UV light-emitting devices 320a-c by hand or by automated transporting equipment (e.g., a conveyor). Preferably, the mounting and assembly apparatus are in the same work area as the UV light-emitting devices 320a-c so that the components need not be transferred or moved between application of the adhesive and application of the UV light.

Referring again to FIG. 2A, the mechanism 220 for placing the alignment-sensitive component can be mechanically, electronically, and/or computer controlled. The dispenser 250 may be supplied with adhesive (and, if necessary or desired, an activator) from a base 260 and a transfer tube 255. Although not shown in FIG. 2A, the dispenser 230 may be supplied by more than one transfer tube. The base 260 may include one or more storage vessels (not shown) for storing the adhesive (and optionally, an activator) and/or one or more pumps (not shown) for providing the adhesive (and optional activator) to the dispenser 250. One or more of the storage vessels and the transfer tube(s) 255 may be equipped with a heating mechanism and/or insulation to maintain a suitable usage temperature at the time of application to one or more components. Alternatively, the dispenser 250 may take the form of a nozzle, needle, sprayer, or other suitable dispenser known in the art. The dispenser 250 may be controlled by hand or by computer, in which case the adhesive may be automatically applied to one or more predetermined locations on the alignment-sensitive component 210. As such, the dispenser base 260 may be connected to a computer (not shown), and/or the adhesive dispensing apparatus may further comprise a guide or frame configured to move and hold a syringe or other adhesive dispenser towards and away from a predetermined position for applying the adhesive to the predetermined location(s) on the alignment-sensitive component 210.

In some embodiments, it may be necessary to combine one or more compounds or ingredients of the adhesive before applying the adhesive to the alignment-sensitive component 210. For example, some epoxies and/or acrylics may include an adhesive and an activator that must be combined prior to or concurrently with placement on or application to the component(s). In such embodiments, the dispenser 250 may have a plurality of compartments that hold each of the adhesive components, and provide a predetermined amount of each component as needed to properly activate the adhesive.

Figure 5A:
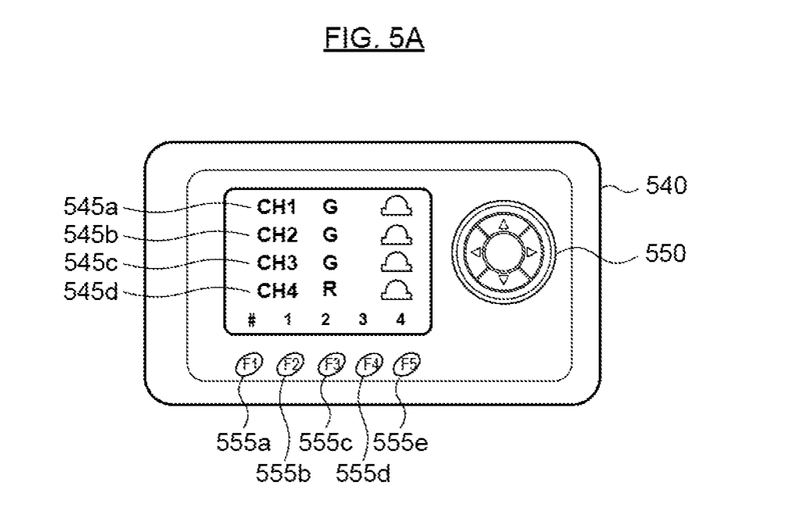
FIG. 5A is a diagram showing a display for an exemplary LED controller for use with exemplary methods and apparatuses in accordance with embodiments of the present invention.

Referring now to FIG. 5A, in one embodiment, the apparatus may comprise a controller 540 configured to vary and control an output of the UV light sources (e.g., light emitting diodes 320a-c in FIG. 3). The controller 540 may control a plurality of channels, each of which can supply the same or different wavelength or wavelength band and/or doses of light from the same light source (e.g., using a beam splitter or dichroic mirror to separate light of different wavelengths or wavelength bands) or different light sources (e.g., light emitting diodes 320a-c in FIG. 3). For example, the controller 540 in FIG. 5A controls up to four channels 545a-d that supply up to four beams of light to the alignment-sensitive component 210 (FIG. 2A)). The controller 540 may also comprise a UV source control panel (e.g., reference character 550 in FIG. 5A). For example, the UV source panel 550 in FIG. 5A includes four subpanels that effectively control or function as an on-off switch for each channel, a beam splitter or "flipper" assembly for a single light source, and/or that can select an available wavelength or wavelength band from the UV light source(s) and control the intensity and/or dose of light provided by the light source(s) (e.g., LEDs 320a-c of FIG. 3A). The controller 540 may also include function buttons F1-F5 555a-e, respectively. The function buttons 555a-e are configured to provide programming stages and/or steps in the UV irradiation profile. For example, the UV radiation may start gradually (e.g., at F1) and then ramp up to four additional stages (F2-F5), each of which provide a relatively higher or lower dose of UV radiation than the previous stage, but at least one additional stage F2-F5 is higher than the first state F1.

Figure 5B:
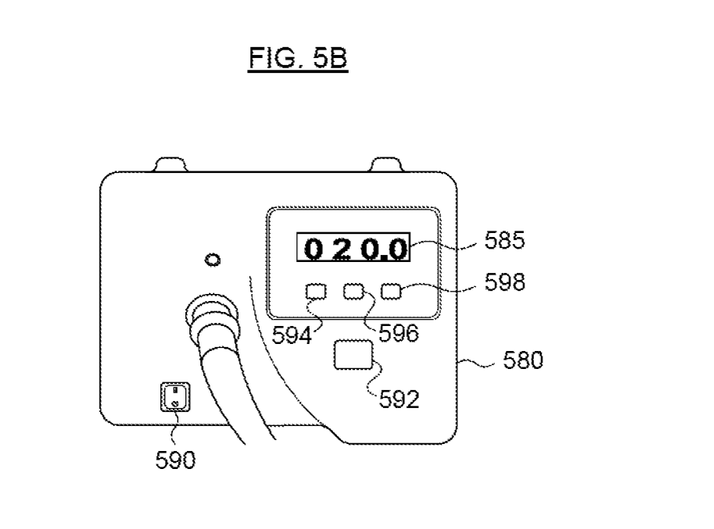
FIG. 5B is a diagram showing a display of a UV light source system for use with the methods and apparatuses of the present invention.

In exemplary embodiments, as shown in FIG. 5B, the apparatus may comprise a current controller 580 having a display 585 configured to show the current provided to the UV light source(s) over each channel. For example, numerical display 585 shows the percentage of maximum current applied to the UV light source(s) (e.g., 20.0%). Alternatively, the numerical display 585 shows the length of time of radiation applied by the UV light source(s). The button 590 may function as an on-off switch for the controller. The button 592 may function as a start-stop switch for programming the controller 580 or for applying current to the light source(s). The buttons 594, 596 and 598 may function as a mode identification and/or sequencing switch, and incremental time increasing and decreasing counters, respectively.

Exemplary Transceivers

Figure 6A:
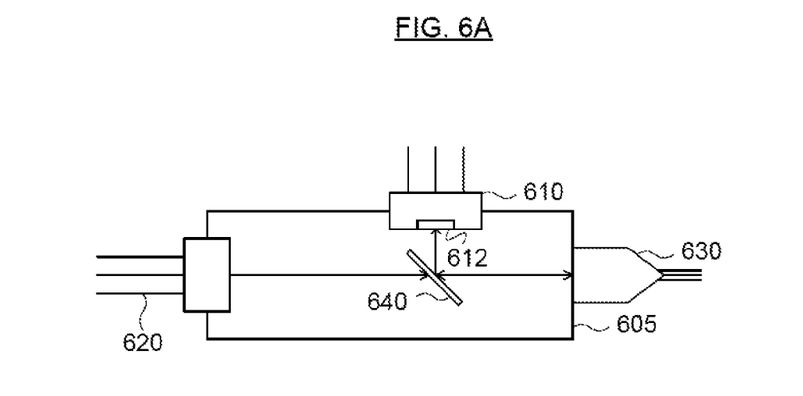
FIG. 6A is a diagram showing a bidirectional transceiver in accordance with embodiments of the present invention.

An exemplary transceiver suitable for use with embodiments of the present invention is shown in FIG. 6A. The transceiver of FIG. 6A is a bidirectional transceiver having a photodiode 612 in receiver optical sub-assembly (ROSA) 610. Light carried by fiber 630 enters the housing 605 and is reflected by a mirror or filter 640 to the photodiode 612. The photodiode 612 converts the light received to an electrical signal, which is received by an electrical device (not shown) elsewhere in the network. Electrical signals from another device in the network (not shown) are received at pins 620 and are converted by transmitter 650 (having a laser diode therein) to an optical signal 655, which has a wavelength different from the light reflected by mirror/filter 640 and which therefore passes through mirror/filter 640, and is transmitted by fiber 630 to other component(s) in the network (not shown).

Figure 6B:
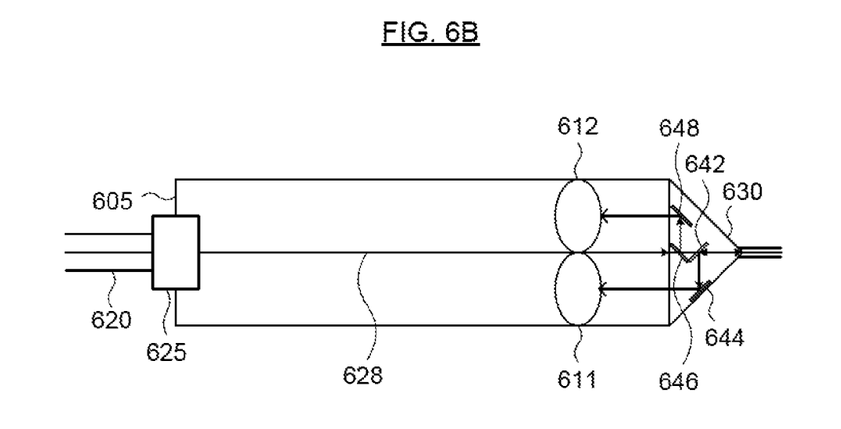
FIG. 6B is a diagram showing an exemplary triplex transceiver in accordance with embodiments of the present invention.

An alternate transceiver suitable for use with embodiments of the present invention is shown in FIG. 6B. The transceiver of FIG. 6B comprises a triplex BOSA including one transmitter optical sub-assembly (TOSA) and two receiver optical sub-assemblies (ROSAs). In this embodiment, light from the fiber 630 enters the housing 605, and part of the light having a first wavelength is reflected from a mirror or filter 642 and, after further reflection by mirror 644, is received by a first photodiode in the first ROSA 611. Similarly, light from the fiber 630 having a second wavelength passes through mirror 642, is reflected from a second mirror 646, and after further reflection by mirror 648, is received by a second photodiode in the second ROSA 612. Transmitter 625 transmits an optical signal 628 based on an electrical signal received at pins 620. The optical signal 628 passes between ROSAs 611 and 612, and enters fiber 630 for transmission to other components in the network.

EXAMPLE

Samples of two UV-active epoxy adhesives (i.e., ABLELUX® AA50T and EPO-TEK® 353ND) were applied to a photodiode, the ABLELUX® AA50T adhesive on the outside edge of the photodiode for pre-placement and the EPO-TEK® 353ND adhesive filled in beside the ABLELUX® AA50T adhesive for enhanced placement. The photodiode was placed into a metal housing for an optoelectronic transceiver via a vacuum chuck and press. The alignment-sensitive element(s) (e.g., the photodiode) within the metal housing was aligned with an optical fiber carrying a light signal. The output current from the photodiode receiving the light signal was measured. After the maximum output current was determined, a relatively low dose of radiation was applied to the ABLELUX® AA50T adhesive (e.g., a current of approximately 500 mA was supplied to an LED configured to provide the dose of radiation) for about 5 seconds to cure an outer region of the combined adhesives. Then, without interruption, a second, relatively high dose of radiation was then applied to the adhesives (e.g., approximately 800 mA to the same LED) for about 5 seconds to cure the remaining thickness of the combined adhesives. The output current was then measured again. Then, more EPO-TEK® 353ND adhesive was filled in the gap between the TO and the base, and the unit was heated to cure the additional adhesive. This process was repeated for tens of thousands of units.

The above-described two-step curing process provided stable positioning and alignment of the photodiode and the housing during the adhesive solidification process. For the tested transceiver, the maximum allowable change in output current is 0.02 mA. However, the change in output current after the two-step UV adhesive curing process was, on average, about 0.005 mA. The yield of acceptable devices using the present two-step curing process was 90.7% for a sample size of about 24,000 units, while an otherwise similar one-step curing process using the EPO-TEK® 353ND adhesive alone provides about 84% yield of devices having a change in output current of 0.02 mA or less. These results indicate a smaller shift in the relative positions of the transceiver components during the curing process using the present two-step curing method.

In addition, the above-described curing process resulted in a reduction in the total amount of time needed to effectively solidify the adhesive. For example, the prior one-step curing process applied radiation at a single dose (and at a single current applied to the light source[s]) for 15 seconds, but the total curing time for the process of this Example was 10 seconds.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of adhering components in an optical, electronic, or optoelectronic device, comprising:
   a) applying a UV-active adhesive onto an alignment-sensitive component of the device;
   b) placing the alignment-sensitive component into the device, the device being attached to an adjustable base;
   c) applying a first, relatively low dose of UV radiation to the adhesive sufficient to solidify an outer layer of the adhesive; and
   d) applying a second, relatively high dose of UV radiation to the adhesive sufficient to solidify a remaining thickness of the adhesive.

2. The method of claim 1, wherein applying each of the first dose of UV radiation and the second dose of UV radiation comprises providing sufficient current or power to at least one LED to cause the at least one LED to emit UV light at the relatively low and the relatively high doses, respectively.

3. The method of claim 2, wherein the first current is from about 10 to 100 mA, the second current is from about 25 to 200 mA, and the second current is higher than the first current.

4. The method of claim 1, wherein the first dose of UV radiation is applied for about 1 second to about 15 seconds.

5. The method of claim 4, wherein the second dose of UV radiation is applied for about 1 second to about 15 seconds.

6. The method of claim 1, further comprising, after placing the alignment-sensitive component into the device and before applying the first dose of radiation, adjusting a position of the device while monitoring an output parameter of the alignment-sensitive component.

7. The method of claim 6, further comprising determining a maximum value of the output parameter, and applying the first dose of UV radiation when the output parameter is at the maximum value.

8. The method of claim 1, wherein the first dose and the second dose are applied for a total of from 3 to 25 seconds.

9. The method of claim 1, wherein the alignment-sensitive component comprises a photodiode.

10. The method of claim 1, further comprising placing the alignment-sensitive component into a metal housing.

11. The method of claim 1, wherein the adhesive comprises a UV-active epoxy.

12. The method of claim 1, wherein the first dose has a minimum intensity of about 50 mW/cm$^2$.

13. The method of claim 1, wherein the device is an optoelectronic transceiver.

* * * * *